US 9,890,678 B2

(12) United States Patent
Qi

(10) Patent No.: US 9,890,678 B2
(45) Date of Patent: Feb. 13, 2018

(54) MULTI-STAGE SCR CONTROL AND DIAGNOSTIC SYSTEM

(71) Applicant: Baohua Qi, Marietta, GA (US)

(72) Inventor: Baohua Qi, Marietta, GA (US)

( * ) Notice: Subject to any disclaimer, the term of this patent is extended or adjusted under 35 U.S.C. 154(b) by 691 days.

(21) Appl. No.: 14/503,414

(22) Filed: Oct. 1, 2014

(65) Prior Publication Data
US 2015/0096287 A1    Apr. 9, 2015

Related U.S. Application Data

(60) Provisional application No. 61/886,243, filed on Oct. 3, 2013.

(51) Int. Cl.
| | |
|---|---|
| *F01N 3/00* | (2006.01) |
| *F01N 3/20* | (2006.01) |
| *F01N 9/00* | (2006.01) |
| *F01N 13/00* | (2010.01) |

(52) U.S. Cl.
CPC ............... *F01N 3/208* (2013.01); *F01N 9/00* (2013.01); *F01N 13/0093* (2014.06); *F01N 2610/02* (2013.01); *F01N 2610/14* (2013.01); *F01N 2610/146* (2013.01); *F01N 2900/0408* (2013.01); *F01N 2900/1621* (2013.01); *F01N 2900/1818* (2013.01); *Y02T 10/24* (2013.01); *Y02T 10/47* (2013.01)

(58) Field of Classification Search
CPC ........ F01N 3/208; F01N 13/0093; F01N 9/00; F01N 2610/02; F01N 2610/14; F01N 2610/146; F01N 2900/0408; F01N 2900/1621; F01N 2900/1818; Y02T 10/24; Y02T 10/47
USPC ........................... 60/286, 285, 295, 296, 299
See application file for complete search history.

(56) References Cited

U.S. PATENT DOCUMENTS

2005/0069476 A1* 3/2005 Blakeman ........... B01D 53/9431
423/239.1

* cited by examiner

*Primary Examiner* — Jason Shanske
*Assistant Examiner* — Kelsey Stanek

(57) ABSTRACT

A multi-stage SCR control system including a front reductant dosing device, a front SCR device, a back reductant dosing device, a back SCR device, and a dosing controller. In normal control cycles, a NSR of the front SCR device is controlled below a stoichiometric reaction ratio to decrease system sensitivity to catalyst aging. In a diagnostic cycle, the NSR of the front or the back SCR device is controlled lower than the stoichiometric reaction ratio, and a reductant quality ratio, which is indicative of reductant quality and dosing accuracy, is calculated. In another diagnostic cycle, the NSR is controlled above the stoichiometric reaction ratio, and an average deNOx efficiency is calculated. The reductant quality ratio and the average deNOx efficiency values are further used in SCR feedback control and permanent catalyst damages can also be isolated from temporary catalyst poisons with these values after a thermal recovery event is completed.

20 Claims, 14 Drawing Sheets

| Failures | | Average DeNOx Efficiency (ADE) | Reductant Quality Ratio (RQR) |
|---|---|---|---|
| Catalyst failures | Permanent failures | ADE is lower than a threshold and low ADE is still detected after a thermal recovery event | RQR is within a predetermined range and is still within the predetermined range after a thermal recovery event |
| | Recoverable failures | ADE is lower than a threshold and becomes high after a thermal recovery event | RQR is within a predetermined range and is still within the predetermined range after a thermal recovery event |
| Reductant quality issues and dosing issues | | ADE is higher than a threshold | RQR is out of a predetermined range |
| Severely damaged catalyst, or serious dosing or reductant quality issues | Catalyst is severely damaged, or dosing apparatus is serious under-dosing, or reductant is diluted too much. | ADE is lower than a threshold | RQR is lower than a threshold |
| | Dosing apparatus is seriously over-dosing, or reductant is condensed too much. | ADE is higher than a threshold | RQR is higher than a threshold |

FIG. 8

MULTI-STAGE SCR CONTROL AND DIAGNOSTIC SYSTEM

This present application claims priority from U.S. provisional application No. 61/886,243 having the same title as the present invention and filed on Oct. 3, 2013.

The present invention relates to an exhaust system for an internal combustion engine, and more specifically, to an exhaust system with a SCR (Selective Catalytic Reduction) apparatus for reducing NOx (Nitrogen Oxides) in exhaust gas of an internal combustion engine.

BACKGROUND OF THE INVENTION

Environmentally harmful species in exhaust gas emitted from an internal combustion engine, such as hydrocarbons (HC), carbon monoxide (CO), particulate matters (PM), and nitric oxides (NOx) are regulated species need to be removed therefrom. In lean combustion engines, due to the existence of large amount oxygen excess, passive means without extra dosing agents, such as that using a three-way catalyst, normally are not able to effectively remove the oxidative specie NOx, as that in most of spark-ignition engines. To reduce NOx in lean combustion engines, a variety of active means with reducing agents (reductants) being dosed in exhaust gas are developed. In these technologies, a dosing amount of reductant is injected into exhaust gas, and the result mixed gas flows into a SCR catalyst, where the reductant selectively reacts with NOx generating non-poisonous species, such as nitrogen, carbon dioxide, and water.

A variety of reductants, such as ammonia (NH3), HC, and hydrogen (H2) can be used in SCR systems. Among them, ammonia SCR is used most broadly due to high conversion efficiency and wide temperature window. Ammonia can be dosed directly. However, due to safety concerns and difficulties in handling pure ammonia, in ammonia SCR systems, normally ammonia is obtained from a urea solution through thermolysis and hydrolysis, and the urea solution in these applications is also called reductant. In mobile applications, typically a eutectic solution of urea, i.e. a 32.5% wt urea solution, is used.

In a SCR system, dosing accuracy significantly affects NOx control performance, especially when engine out NOx level is high. For example, if engine out NOx is 1000 ppm, with a NSR (Normalized Stoichiometric Ratio) of 1.0, 1000 ppm ammonia is needed (in a SCR system, a NSR value is equal to a ratio of a molar amount of ammonia generated from dosed reductant to a molar amount of NOx, in an exhaust gas flow to be processed). If an uncertainty of 5% exists in dosing control, then 50 ppm of ammonia could be over- or under-generated. Though in transient, SCR catalyst has certain capability storing ammonia, damping the effects of under-dosing and over-dosing, in average, these effects may still cause issues. In the example above, if the SCR system is tuned for an average doser with zero storage usage, then an under-dosing doser may create 50 ppmNOx slip in average, which is almost 0.3 g/bhp·hr in normal operations. Compared to the US2010 emission standard of 0.2 g/bhp·hr, it is 150% uncertainty. This calculation just includes doser uncertainty. Other important factors, such as NOx sensor error, urea decomposition error, and exhaust flow rate error, also could contribute to the overall control uncertainty.

Using SCR catalyst with large storage capability (e.g. a Cu-zeolite catalyst) together with an AMOX (AMmonia OXidation) catalyst desensitizes NOx control to NSR. Thereby uncertainties in dosing system and sensors can be compensated through over-dosing. However, relying on the storage capability of SCR catalyst and AMOX could cause aging issues, since both of the storage capability of SCR catalyst and the selectivity of AMOX are subject to aging effects. An aged AMOX tends to oxidize ammonia slip back to NOx, and an aged SCR catalyst has lower deNOx efficiency. Therefore, the aging of the catalysts may cause NOx slips with over-dosing, especially when temperature variation releases stored ammonia in SCR catalyst. Additionally at high NSRs, deNOx efficiency is more sensitive to catalyst aging than at low NSRs, and the high sensitivity to catalyst aging lowers the lifetime of the catalyst.

All these issues cause difficulties in applications in which high deNOx efficiency has to be maintained. For example, to reach the requirements of 0.2 g/bhp·hr (emission limit) to 0.4 g/bhp·hr (OBD limit) set by the US2010 and CARB2016 emission regulations, when an engine out NOx level is 4.0 g/bhp·hr, a deNOx efficiency of 95% is needed for normally operations and when the deNOx efficiency drops below 90%, a fault needs to be generated. The high efficiency requirements for SCR systems cause difficulties in controlling NOx level and detecting system failures due to effects of uncertainties in dosing system and sensors, resulting in high system and warranty costs.

To lower the deNOx efficiency requirement, engine out NOx concentration has to be limited to a low level with EGR (Exhaust Gas Recirculation) technology, and retarded fuel injection. However, too much EGR and fueling retard may deteriorate engine operating performance and fuel economy. Additionally, a trade-off between NOx emission and PM emission exists in engine control. Lowering engine out NOx normally causes increase in PM emission and fuel economy is further deteriorated due to that more energy needs to be consumed in regenerating the DPF which traps PM.

In addition to the issues with high deNOx efficiency, in SCR controls, when a feedback control is used for more accurately and reliably controlling deNOx efficiency, changes in deNOx efficiency caused by catalyst aging and issues in delivering reductant require different compensations, causing difficulties in the feedback control. For example, when catalyst ages, normally deNOx efficiency cannot be increased by increasing dosing rate, and at higher NSRs, increasing dosing rate even decreases deNOx efficiency. However, if reductant solution is diluted or a dosing apparatus is under dosing, increasing dosing rate increases deNOx efficiency. The different compensation directions make the feedback control possibly go into positive feedback if the causes to changes in deNOx efficiency are unknown.

Another issue in a SCR system is temporary decrease in deNOx efficiency. Failures of a SCR catalyst, which causes low deNOx efficiency, include both permanent and temporary failures. Permanent failures, such as thermal damage, precious metal contamination, and package metal contamination, are not recoverable. Once these failures are detected for a catalyst, the catalyst then needs to be replaced. However, temporary failures, e.g., HC poison or sulfur poison caused failures, can be recovered with high temperature exhaust gas, which could be generated through post fuel injections in an engine and/or using HC dosing in a DOC/DPF system upstream from the SCR system. Temporary failures need not catalyst replacement. To lower warranty cost, permanent damages to the catalyst need to be separated from these temporary failures.

To solve the problems in a SCR system so that high deNOx efficiency can be obtained with a feedback control and more issues in the SCR system can be detected, a primary object of the present invention is to provide a multi-stage SCR control system, in which deNOx efficiency of each catalyst device is controlled according to a target value. In this system, the deNOx efficiencies can be adjusted according to different requirements. Targeting the deNOx efficiency of a front SCR device to a value with NSR lower than a stoichiometric reaction ratio decreases system sensitivity to catalyst aging and difficulties in detecting catalyst failures.

A further objective of the present invention is to provide a SCR diagnostic system, in which both of problems in catalyst and issues in dosing system and reductant quality can be detected.

Another objective of the present invention is to provide a SCR feedback control system in which a deNOx efficiency value and a reductant quality ratio value, which is indicative of reductant quality and dosing accuracy, are used in adjusting dosing control in feedback loops.

Yet another objective of the present invention is to provide a SCR diagnostic system that is able to distinguish permanent failures from temporary ones.

BRIEF SUMMARY OF THE INVENTION

The present invention provides an apparatus and method for delivering reducing NOx in exhaust gas emitted from an internal combustion engine. More specifically, this apparatus includes a front reductant injecting device, a front SCR device, a back reductant injecting device, a back SCR device, and a DCU (Dosing Control Unit). In an embodiment of the present invention, the front SCR device includes a front SCR catalyst and an optional AMOX, while the back SCR device includes a back SCR catalyst and an AMOX. Reductant is provided to the front and the back injecting devices by an air driven pump, which includes a liquid supply tank (LST) and a pressure tank (PT), control solenoids, and a reductant tank. In this embodiment, NOx levels are measured with both virtual and physical sensors: a NOx model is used for estimating engine out NOx; a first NOx sensor is positioned in between the front SCR device and the back reductant injecting device, and a second NOx sensor is installed downstream from the back SCR device. In the SCR devices, the temperatures of the front and back SCR catalysts are measured with three temperature sensors located respectively upstream from the front SCR device, downstream from the back SCR device, and in between the front SCR device and the back SCR device.

In controlling the reductant dosing rates, target deNOx efficiencies are used for determining reductant dosing commands for the front and the back reductant injecting devices. The goal of the controls is to keep the deNOx efficiencies of the front and the back SCR devices at the target deNOx efficiency values, and feedback controls can be used for further improving the accuracy and robustness of the control. To have a SCR control system insensitive to catalyst aging and to facilitate diagnosis for catalyst failures, the target deNOx efficiency value in controlling the reductant dosing rate of the front SCR device is set to have a NSR control value lower than a stoichiometric reaction ratio, which is the reaction ratio between NH3 and NOx.

In diagnosing the SCR devices, the NSR control value is temporarily overrode to be higher than the stoichiometric reaction ratio, and an average deNOx efficiency is calculated, while a reductant quality ratio, which is indicative of reductant quality and dosing accuracy, is calculated after the NSR control value is set to be lower than the stoichiometric reaction ratio. A variety of failures in the front and back SCR devices, including catalyst failures, reductant quality issues, and dosing issues can be detected with the average deNOx efficiency and the reductant quality ratio values.

The average deNOx efficiency and the reductant quality ratio are further used in a feedback control. In an exemplary control method, the average deNOx efficiency and the reductant quality ratio are used for determining compensation directions in a target deNOx efficiency control loop, while in another example, the average deNOx efficiency and the reductant quality ratio are employed in directly compensating dosing rate calculation.

The average deNOx efficiency and the reductant quality ratio are also used in separating permanent catalyst damage from temporary poison. In an exemplary method, a thermal recovery event, in which high temperature exhaust gas is generated, is triggered after low average deNOx efficiency is detected and the reductant quality ratio is in a predetermined range. A fault of permanent catalyst damage is only triggered when low average deNOx efficiency is obtained again right after the thermal recovery event and the reductant quality ratio is still in the predetermined range.

BRIEF DESCRIPTION OF THE DRAWINGS

FIG. 8 is a table in which failures in a SCR catalyst device and corresponding changes in average deNOx efficiency and reductant quality ratio values are summarized.

DETAILED DESCRIPTION OF THE INVENTION

Figure 1:
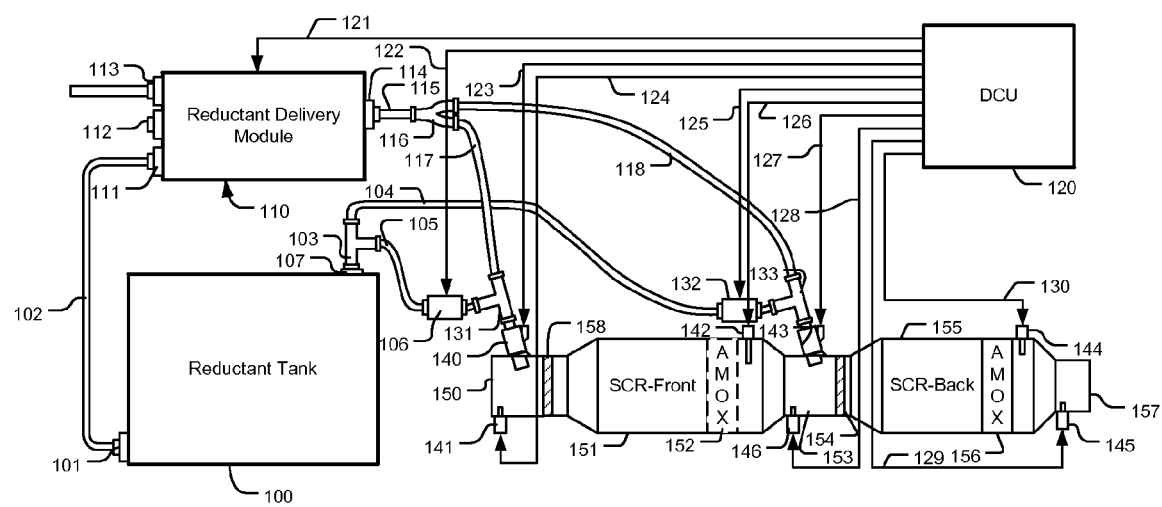
FIG. 1 is a schematic representation of a two-stage SCR system.

Referring to FIG. 1, a two-stage SCR system includes two SCR devices, a front SCR device and a back SCR device.

The front SCR device has a SCR catalyst 151 and an optional AMOX 152 inside, and the catalyst 151 is at the front of the AMOX 152. Upstream from the front SCR device, an injector 140, which is controlled by a DCU 120 through signal lines 123, is installed on an exhaust gas passage 150 for delivering reductant into exhaust flow, and a temperature sensor 141 is positioned upstream from the injector 140 for providing temperature sensing signals to the DCU 120 through signal lines 124. In between the injector 140 and the catalyst 151, in the exhaust gas passage 150, a mixer 158 is used for creating a uniform exhaust flow. Downstream from the AMOX 152, a NOx sensor 143 electrically connected to the DCU 120 through signal lines 126 is used for measuring NOx concentration in exhaust gas, and an exhaust gas passage 153 connects the front SCR device to the back SCR device, inside which a catalyst 155 is followed by an AMOX 156. On the exhaust gas passage 153, a temperature sensor 146 reports sensing values of exhaust gas temperature to the DCU 120 through signal lines 128, and another injector 143, which is controlled by the DCU 120 through signal lines 127, is used for delivering reductant into exhaust gas. In between the injector 143 and the catalyst 155, a mixer 154 is used for creating a uniform exhaust flow. Downstream from the AMOX 156, a NOx sensor 144, which communicates to the DCU 120 through signal lines 130, is used for providing NOx concentration sensing information. And on an exhaust gas passage 157, a temperature sensor 145 sends sensing signals to the DCU 120 through signal lines 129. In the system, the reductant released from the injector 140 is mixed with exhaust gas and the mixed gas enters the front SCR device through the mixer 158. In the front SCR device, NOx in the mixed gas reacts with the reductant, and the result gas is dosed again with the reductant released from the injector 143. The mixed gas becomes more uniform through a mixer 154 and enters the back SCR device for further NOx reduction. Compared to a system with a single SCR device, the re-mixing process through the mixer 154 increases uniformity of exhaust gas and thereby increases system deNOx efficiency.

In the SCR system of FIG. 1, reductant is stored in a reductant tank 100, and though a port 101, a passage 102, and a port 111, reductant enters a reductant delivery module 110, inside which a PCU (Pump Control Unit, not shown in FIG. 1) communicates to the DCU 120 through signal lines 121. The reductant delivery module 110 has a port 113 fluidly connected to a compressed air source (not shown in FIG. 1), and a vent 112 for releasing air. Under pressure provided by the compressed air source, reductant in the reductant delivery module 110 flows out through a port 114, which is fluidly connected to the inlet port of a Y connector 116 through a passage 115. The Y connector 116 has an outlet port fluidly coupled to the injector 140 through a passage 117 and a T connector 131, and another outlet port fluidly coupled to the injector 143 though a passage 118 and a T connector 133. To drain reductant residue after a dosing process completes, a solenoid valve 106 controlled by the DCU 120 through signal lines 122 fluidly connects the T connector 131 to a T connector 103 through passages 105. The T connector 103 has another port fluidly connected to a port 107 of the reductant tank 100, and a third port fluidly coupled to the T connector 133 through passages 104 and a solenoid valve 132, which is controlled by the DCU 120 through signal lines 125.

Figure 2:
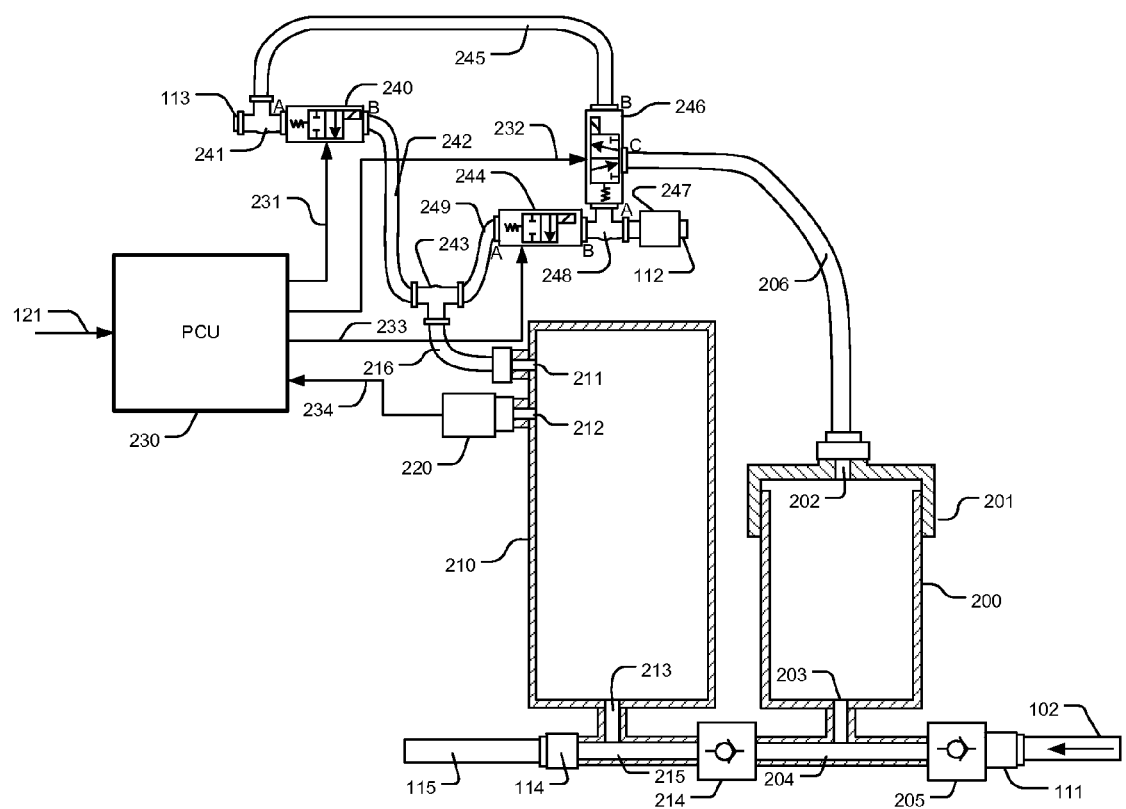
FIG. 2 depicts an air driven hydraulic pump system in a reductant delivery module.

In the reductant delivery module 110 of FIG. 1, an air driven pump can be used for driving reductant from the port 111 to the port 114. An embodiment of the air driven pump is shown in FIG. 2. In the air driven pump, a PT 210 has a port 213 fluidly connected to a reductant passage 215, and a LST 200 has a port 203 fluidly connected to a reductant passage 204. The reductant passage 204 is fluidly connected to the port 111 through a check valve 205 and fluidly connected to the reductant passage 215 through a check valve 214. The check valves 205 and 214 make reductant only flow from the port 111 to the LST 200 and from the LST 200 to the reductant passage 215, which is also fluidly connected to the port 114. On the top of the LST 200, a cap 201 is screwed and a port 202 in the cap 201 is fluidly coupled to the port C of a three-way solenoid valve 246 through an air passage 206. The port A of the solenoid valve 246 is fluidly connected to a T connector 248, which has another port fluidly connected to the port B of a two-way normally closed solenoid valve 244 and a third port fluidly coupled to the port 112 through an optional muffler 247. The solenoid valves 244 and 246 are controlled by a PCU 230 through signal lines 233 and 232 respectively. Through an air passage 245, the port B of the solenoid valve 246 is fluidly coupled to a T connector 241, which has another port fluidly connected to the port A of a two-way normally closed solenoid valve 240, and a third port fluidly connected to the port 113. The solenoid valve 240 is controlled by the PCU 230 through signal lines 231, and its port B is fluidly coupled to a T connector 243 through an air passage 242. The T connector 243 has another port fluidly coupled to a port 211 of the PT 210 through an air passage 216, and a third port fluidly connected to the port A of the solenoid valve 244 through an air passage 249. The solenoid valve 246 is used for controlling air flow to the LST 200, while the solenoids 240 and 244 are employed in controlling air pressure in the PT 210. The pressure inside the PT 210 is measured by a pressure sensor 220 mounted to a port 212, and sensing signals generated by the pressure sensor 220 is sent to the PCU 230 through signal lines 234.

Referring back to FIG. 1, in the SCR system, the DCU generates two reductant dosing rates based on sensing signals obtained from the temperature sensors 141, 146, and 145, NOx sensors 142 and 144, and engine operating information, such as engine speed, fueling rate and timing, fresh air flow rate, charge air flow rate and pressure, and ambient temperature and humidity, which can be provided by an ECU (Engine Control Unit, not shown in FIG. 1) through communication.

In the SCR system of FIG. 1, the multi-stage structure allows a NOx model used in SCR controls for estimating engine out NOx level. In an engine, NOx level is determined by engine operating modes and ambient conditions, therefore, it can be estimated by using values of fueling control parameters, such fueling rate and timing, and sensing values obtained from engine sensors, such as engine speed sensors, EGR (Exhaust Gas Recirculation) valve position sensors, fresh air mass-flow sensors, EGR flow sensors, ambient pressure sensors, and ambient humidity sensors. However, due to sensing accuracy and difference in response time, NOx sensing values calculated with a model are not as accurate as that obtained from physical sensors. The inaccuracy of model based NOx sensing makes it typically can only be used for applications with deNOx efficiency lower than 80%, resulting in that physical NOx sensors are required in most applications with Euro VI or US 2010 regulations. In the system of FIG. 1, the multi-stage structure allows high overall deNOx efficiency obtained with a low front SCR efficiency. For example, when the front SCR deNOx efficiency is 80%, and the back SCR deNOx efficiency is 85%, the total deNOx efficiency is 97%. The low deNOx efficiency requirement makes it possible to use a model based NOx sensing in estimating engine out NOx level.

Figure 3A:
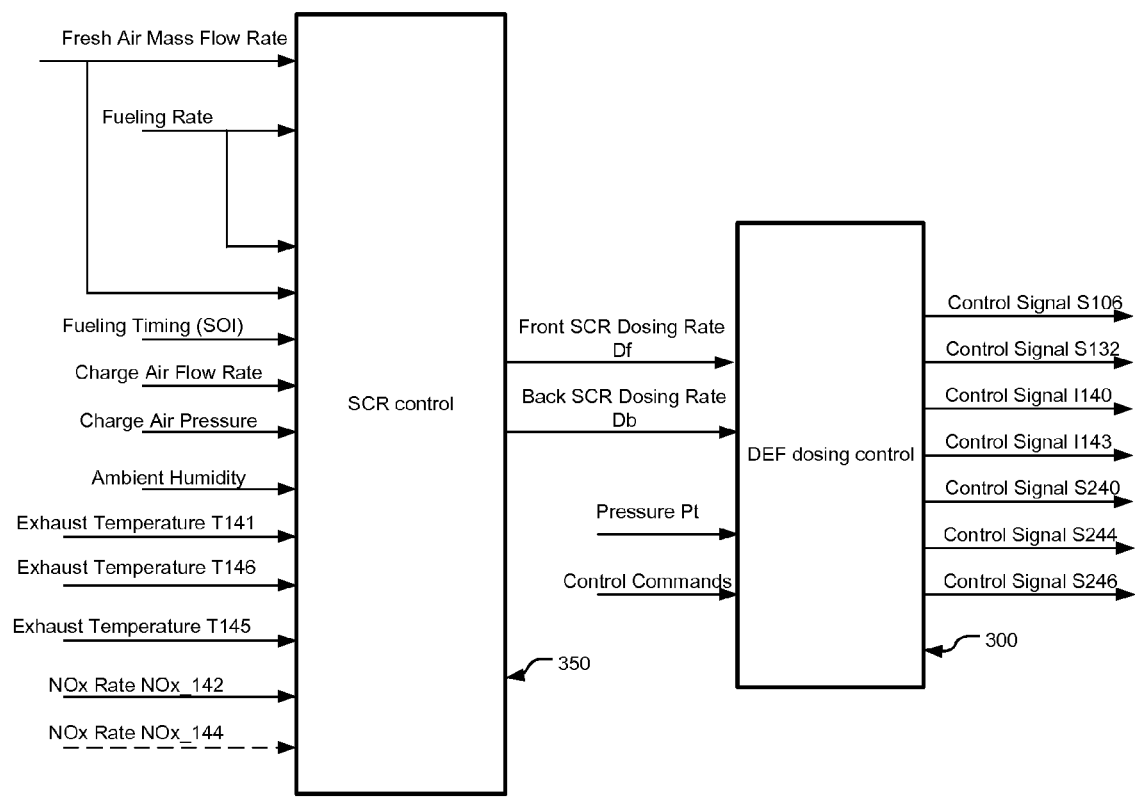
FIG. 3a is a block diagram of a SCR control system.

An example of a SCR control system is shown in FIG. 3a. In this system, a SCR control unit 350 is used for generating a front SCR dosing rate command Df and a back SCR dosing rate command Db for a reductant dosing control unit 300. Inputs to the SCR control unit 350 includes a fresh air mass flow rate, fueling rate values, fueling timing values, a charge air flow rate, a charge air pressure, an ambient humidity, exhaust temperature sensing values T141, T146, and T145 obtained respectively from the temperature sensors 141, 146, and 145, and NOx sensing values NOx_142 and NOx_144 obtained respectively from the NOx sensors 142 and 144. The reductant dosing control unit 300 is used to generate control signals S106, S132, S240, S244, and S246 respectively for the solenoid valves 106, 132, 240, 244, and 246, and control signals 1140 and 1143 respectively for the injectors 140 and 143. The reductant dosing control unit 300 has four inputs. In addition to the dosing rate commands Df and Db, the pressure Pt obtained from the pressure sensor 220, and control commands, which determine status of a dosing control, are also used in generating the control signals.

Figure 3B:
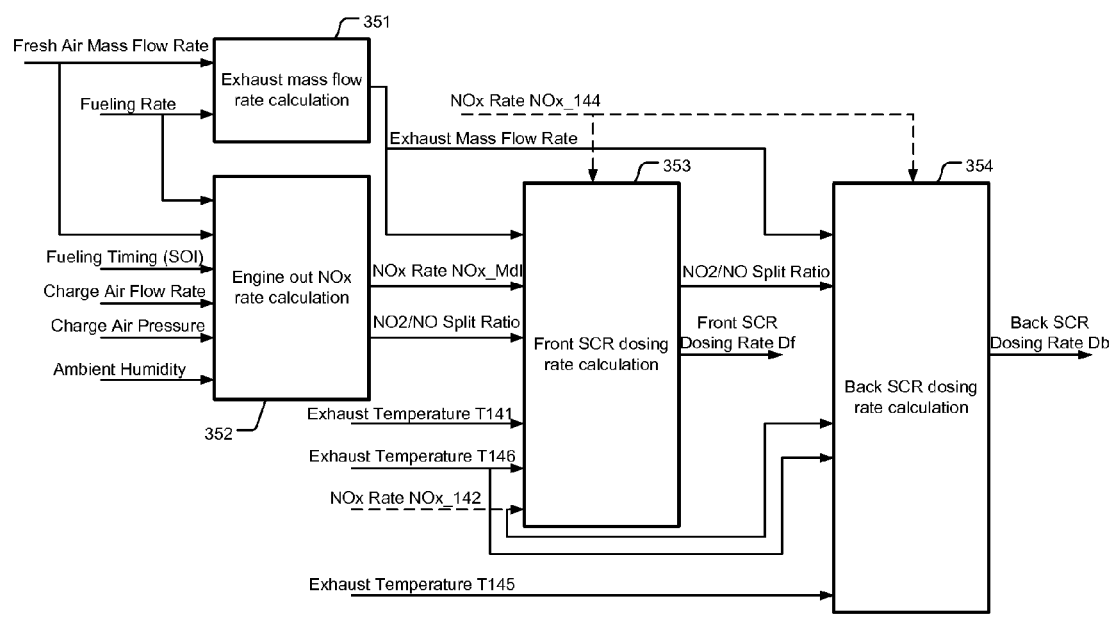
FIG. 3b is a block diagram of a SCR control unit in a SCR control system.

In the SCR control unit 350, as shown in FIG. 3b, the fresh air mass flow rate and the fueling rate values are used in a block 351 in estimating an exhaust mass flow rate Mf, and in a block 352 in estimating an engine out NOx rate, NOx_Front, and a NO2/NO split ratio Sr1, together with the fueling timing values, the charge air flow rate, the charge air pressure, and the ambient humidity. The temperatures T141 and T146 are used in a block 353 in calculating an average temperature of the front SCR, and the dosing rate command Df is calculated according to the exhaust mass flow rate Mf, the NOx_Front values, and the NO2/NO split ratio Sr1. To have a better control performance, a feedback control can be further used in generating the Df value with NOx sensing values NOx_142 and NOx_144. The NO2/NO split ratio is also adjusted in the block 353, and the result values Sr2 together with the exhaust mass flow rate Mf, the NOx_142 values, the temperature T146, and a temperature sensing value T145 obtained from the temperature sensor 145 are used in a block 354 for calculating the dosing rate command Db. As that in the block 353, the temperatures T145 and T146 are used in calculating an average temperature in the back SCR, and to have a better control performance, a feedback control with the NOx_144 sensing values can be used in adjusting dosing rate.

Figure 3C:
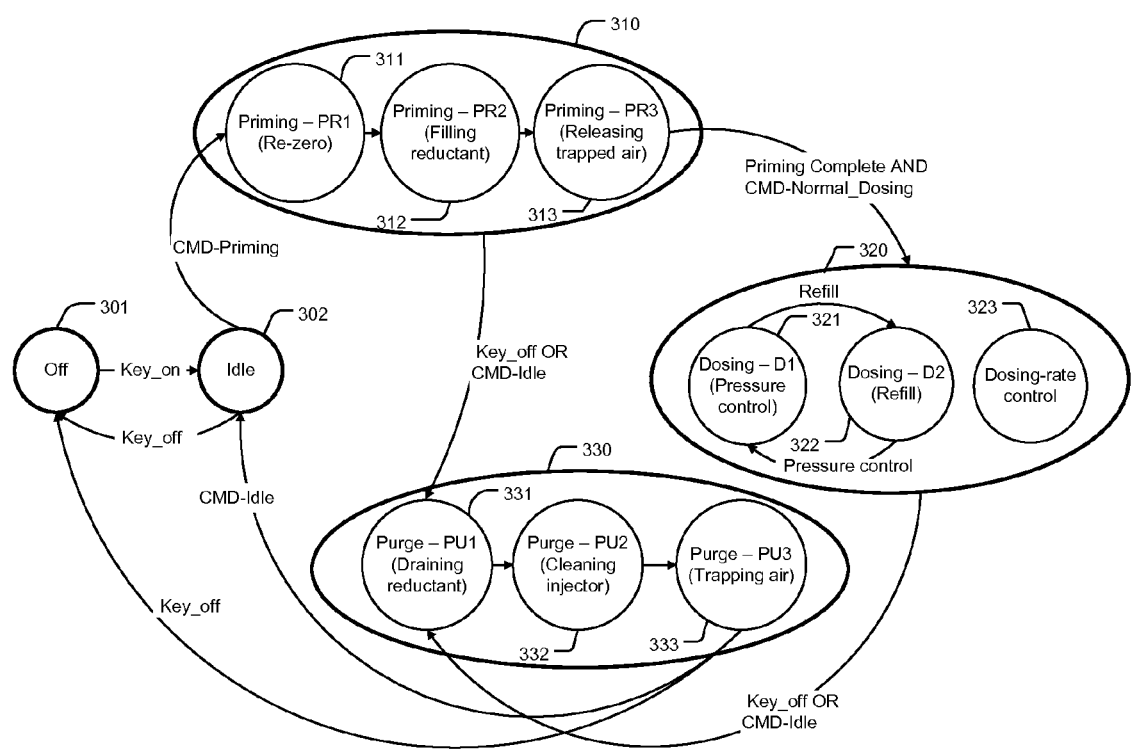
FIG. 3c is a state-machine diagram of a reductant (DEF) dosing control unit in a SCR control system.

Referring back to FIG. 3a, the reductant dosing control unit 300 can be realized with a state machine. An example of such a state machine is shown in FIG. 3c. In the state machine, there are five main states: an Off state 301, an Idle state 302, a Prime state 310, a Normal-dosing state 320, and a Purge state 330. Upon a Key-on flag, the routine goes from the Off state 301 into the Idle state 302. If a command CMD-Priming is received, then the routine enters the Prime state 310, otherwise, if a Key-off flag is received, then the state machine goes back to the Off state 301. The Prime state includes three sub-states: a PR1 sub-state 311, in which the reductant volume in the PT 210 is re-zeroed, a PR2 sub-state 312 for filling the PT 210 with reductant, and a PR3 sub-state for releasing trapped air in the injecting devices 140 and 143. After the Prime state is completed, if a command CMD-Normal_dosing is received, then the routine enters the Normal-dosing state 320, otherwise, if a Key-off flag or a CMD-Idle command is obtained, then the routine goes into the Purge state 330. The Normal-dosing state also includes three sub-states: a D1 sub-state 321 in which the LST 200 is refilled, a D2 sub-state 322 for refilling reductant from the LST 200 to the PT 210, and a Dosing-rate control sub-state 323, in which reductant delivery rate is controlled with a PWM (Pulse Width Modulation) method. In the D1 sub-state and the D2 sub-state, reductant pressure in the PT 210 is controlled within a predetermined range. The Dosing-rate control sub-state 323 is independent to the D1 sub-state 321 and the D2 sub-state 322, i.e., in the Normal-dosing state, the Dosing-rate control sub-state 323 runs all the time, while the D1 sub-state 321 and D2 sub-state 322 run alternately. Running in the Normal-dosing state, if a command CMD-Idle or a Key-off flag is received, the routine enters the Purge state 330. As the Normal-dosing state 320, the Purge state 330 also includes three sub-states: a PU1 sub-state 331 for draining reductant in passages, a PU2 sub-state 332, in which reductant residue in injecting devices 140 and 143 is released into exhaust pipe, and a PU3 sub-state 333, in which a certain amount of compressed air is trapped in the PT 210 for keeping the PT 210 from being refilled.

Figure 4A:
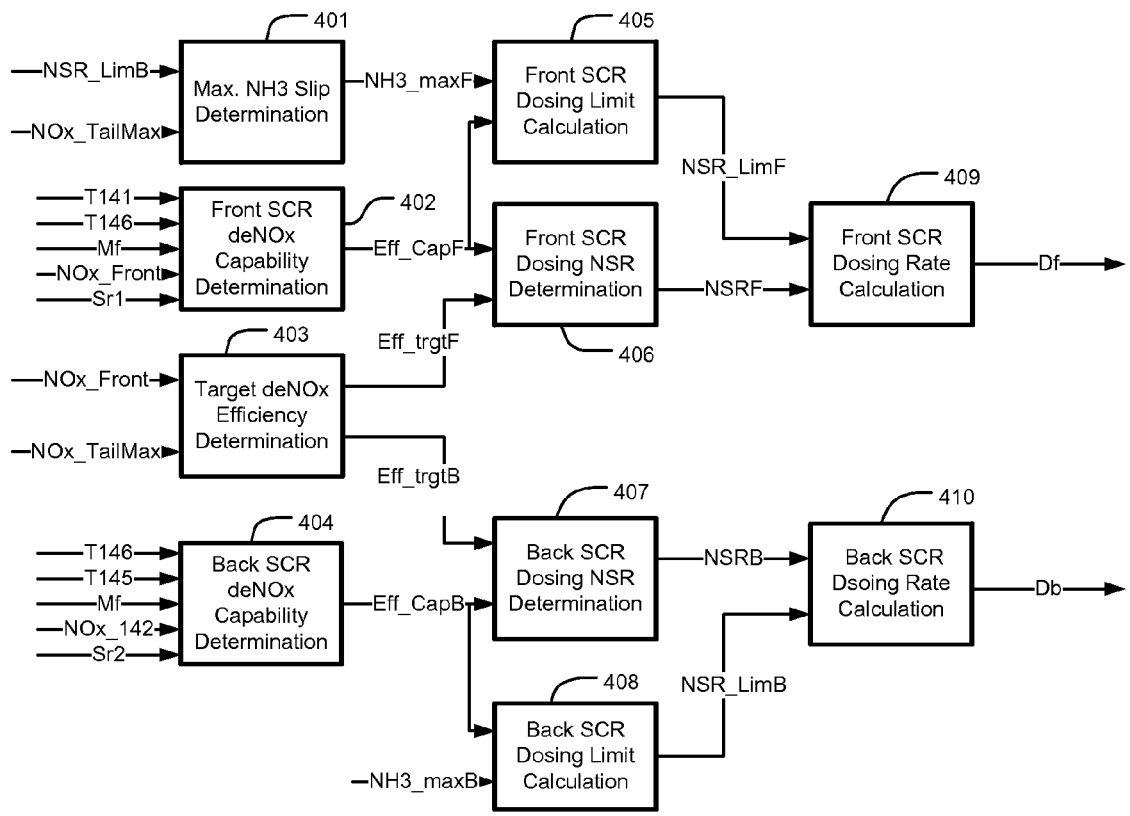
FIG. 4a is a block diagram for a feed-forward realization of a front SCR dosing rate calculation block and a back SCR dosing rate calculation block in a SCR control.

In the SCR control unit of FIG. 3b, a variety of control methods can be used for generating the dosing rate commands Df and Db in the block 353 and 354. The block diagram of an exemplary control method is shown in FIG. 4. In this control, a deNOx efficiency capacity value of the front SCR, Eff_CapF, is calculated in a block 402 with the temperature values T141 and T146 obtained from the temperature sensors 141 and 146, the exhaust mass flow rate Mf, the engine out NOx concentration value NOx_Front, and the NO2/NO split ratio Sr1. The Eff_CapF value together with a maximum allowed NH3 slip value, NH3_maxF, calculated with a back SCR NSR limit value NSR_LimB and a maximum allowed NOx concentration value NOx_TailMax in a block 401, are used in a block 405 for calculating a front SCR NSR limit value NSR_LimF. A target deNOx efficiency value Eff_trgtF is calculated in a block 403 with the NOx_Front value and the NOx_TailMax value in a block 403. And the Eff_CapF value together with the Eff_trgtF value are used in block 406 for calculating a front SCR dosing NSR value, NSRF, which is then used with the NSR_LimF value in a block 409 in calculating the front SCR dosing rate command Df. In the block 403, a target deNOx efficiency value Eff_trgtB for the back SCR is also calculated. The Eff_trgtB value together with a deNOx capacity value for the back SCR, Eff_CapB, which is calculated in a block 404 with the T145 and T146 values, the Mf value, the NOx sensing value NOx_142, and the NO2/NO ratio value Sr2, are used in a block 407 for calculating a back SCR NSR value NSRB. In a block 408, the Eff_CapB value is also used together with a maximum allowed NH3 slip value, NH3_MaxB, for calculating the NSR_LimB value. And the NSR_LimB value and the NSRB value are used in a block 410 in calculating the back SCR dosing rate command Db.

In the control of FIG. 4, the NOx_TailMax value is determined by the required NOx emission level and the NH3_maxB is the maximum allowed slip value at the outlet of the back SCR 155. The NH3_maxB value is determined by the maximum allowed NH3 at the tailpipe 157, the deNH3 efficiency of the AMOX 156 (FIG. 1) and its selectivity, i.e., its capability of converting NH3 to nitrogen and water over converting NH3 to NOx. Normally, for a fresh AMOX, both of the deNH3 efficiency and the selectivity are high. However, when an AMOX ages, its selectivity ages faster, causing more NH3 be oxidized to NOx rather than converted to nitrogen and water. To avoid aging issues, the NH3_maxB value should be calculated with the deNOx efficiency and the selectivity of an aged AMOx or an "end of useful life" AMOX.

Figure 4B:
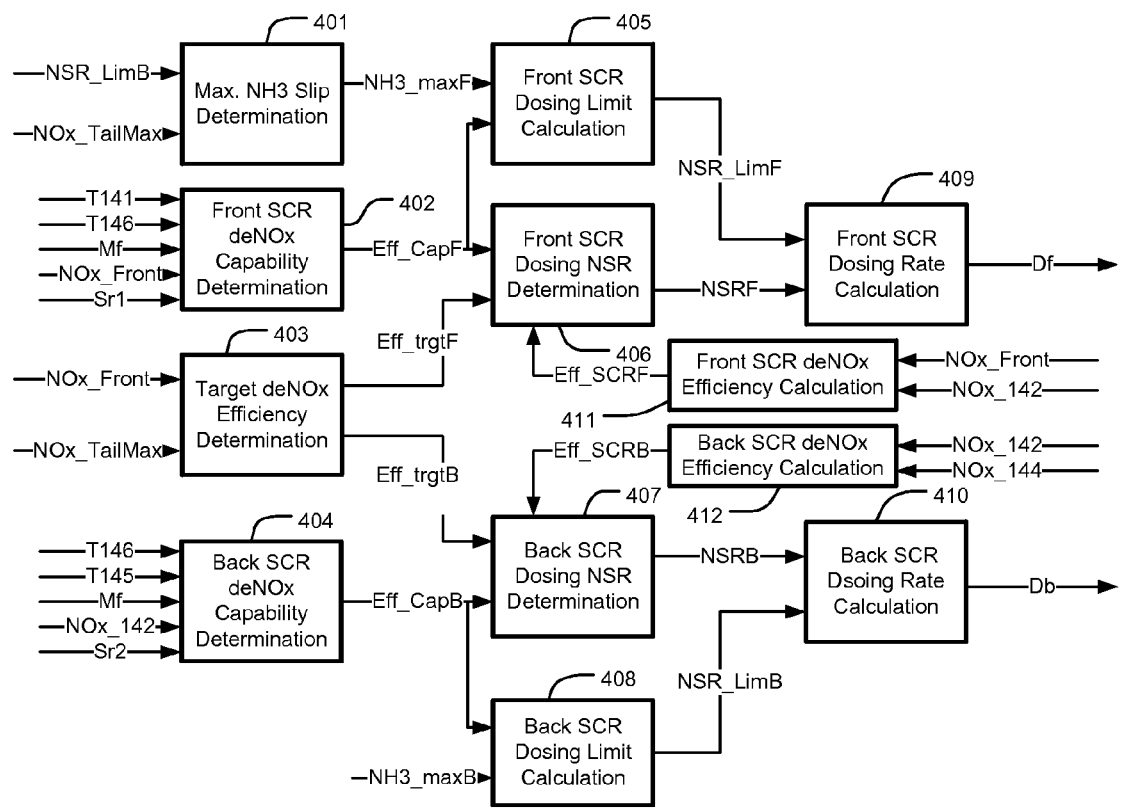
FIG. 4b is a block diagram for a feed-back realization of a front SCR dosing rate calculation block and a back SCR dosing rate calculation block in a SCR control.

With the given NOx_TailMax and the NH3_MaxB values, under operating conditions detected by the sensing values of T141, T145, T146, Mf, NOx_Front, NOx_142, Sr1, and Sr2, the dosing commands Db and Df can be controlled by changing the target deNOx efficiency values Eff_trgtB and Eff_trgtF. To more accurately control the deNOx efficiencies, as shown in FIG. 4b, a feedback control can be used for further adjusting the dosing commands Db and Df. In FIG. 4b, a deNOx efficiency of the front SCR, Eff_SCRF, can be calculated using the NOx_Front value and the NOx_142 sensing value in a block 411, and the Eff_SCRF value is then used in the block 406, compared with the Eff_trgtF value in generating a control error, which is then used in a feedback control for adjusting the NSRF value and the dosing command Df. Similarly, in a block 412, the NOx_142 sensing value and the NOx_144 sensing value are used in calculating a deNOx efficiency of the back SCR, Eff_SCRB, which is used in the block 407 for adjusting the NSRB value and the dosing command Db. With the feedback controls, the deNOx efficiency of the front SCR and the back SCR can be controlled respectively at target values Eff_trgtF and Eff_trgtB, and changes in the SCR devices can be compensated.

In the multi-stage SCR control system of FIG. 1, the deNOx efficiency of the front SCR and the back SCR can be controlled independently. In an SCR, there are two dominant reactions between NH3 and NOx, i.e., a standard SCR reaction:

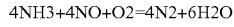

and a fast SCR reaction:

Figure 5A:
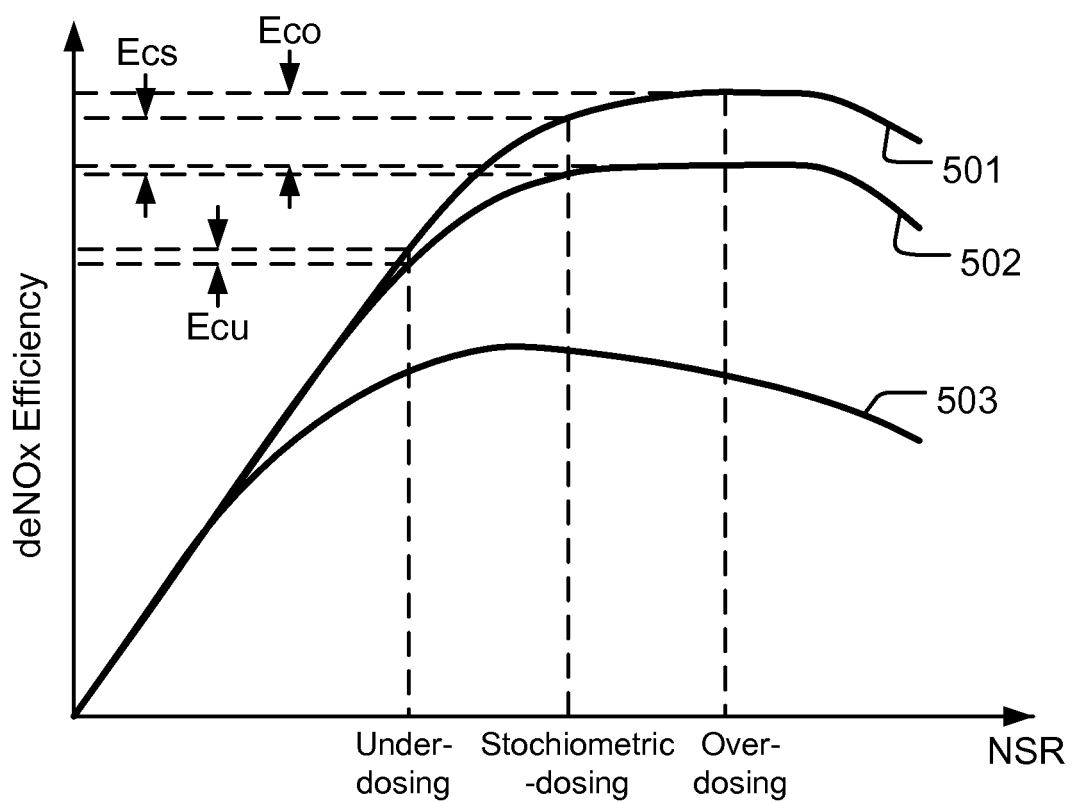
FIG. 5a shows relation curves between NSR values and deNOx efficiencies of normal and aged SCR devices.

In these two reactions, the ratio between NH3 and NOx is 1:1. This ratio is also called stoichiometric reaction ratio. Referring to FIG. 5a, a curve 501 shows a relation between the deNOx efficiency of a normal SCR device and NSR under a given operating condition. When NSR is lower than the stoichiometric reaction ratio, since NH3 is more than NOx, the deNOx efficiency increases with NSR. The deNOx efficiency reaches its highest value at a NSR around the stoichiometric reaction ratio and becomes flat. When NSR is much higher than the stoichiometric reaction ratio, too much NH3 may block catalytically active sites, causing lower deNOx efficiency. Typically, NSR values higher than the stoichiometric reaction ratio, i.e., over-dosing, are preferred, since the maximum deNOx efficiency can be obtained, and the deNOx efficiency is insensitive to NSR.

When a SCR device ages, as shown in a curve 502, the deNOx efficiency decreases due to loss of catalytically active sites, and since more NH3 needs more catalytically active sites to react with NOx, at a higher NSR, deNOx efficiency decreases more than that at a lower one. When the SCR device further ages, indicated by a curve 503, the flat zone of the deNOx efficiency around the stoichiometric reaction ratio becomes small, since less catalytically active sites are easier to be blocked.

In the SCR system of FIG. 1, the deNOx efficiency of the front SCR can be controlled lower than the stoichiometric reaction ratio (under-dosing) to make the system less sensitive to catalyst aging and facilitate diagnosis for catalyst failures. In the SCR system, the overall deNOx efficiency is a function of the front SCR deNOx efficiency and the back SCR deNOx efficiency:

$$\text{Eff\_total}=1-(1-\text{Eff\_front})*(1-\text{Eff\_back})=\text{Eff\_front}+\text{Eff\_back}-\text{Eff\_front}*\text{Eff\_back} \qquad (1),$$

where Eff_front is the deNOx efficiency of the front SCR; Eff_back the deNOx efficiency of the back SCR, and Eff_total is the overall deNOx efficiency of the SCR system. For example, according to equation (1), to have an overall deNOx efficiency of 94%, we just need a front SCR deNOx efficiency of 70% and a back SCR deNOx efficiency of 80%.

As shown in FIG. 5a, when a SCR catalyst ages, the deNOx efficiency at under-dosing NSRs decreases less than that at over-dosing NSRs. This fact makes the system less sensitive to catalyst aging, since the catalyst must be very aged before the deNOx efficiency at under-dosing NSRs is significantly affected. Furthermore, normally, in a SCR catalyst, aging starts from its front portion, since in catalyst failure modes, such as thermal damage, precious metal contamination, package metal contamination, hydrocarbon coating, and sulfur position, the front portion is affected much more than the back portion. The insensitivity of the front SCR to catalyst aging makes the overall system insensitive to the effects causing catalyst aging.

Figure 6A:
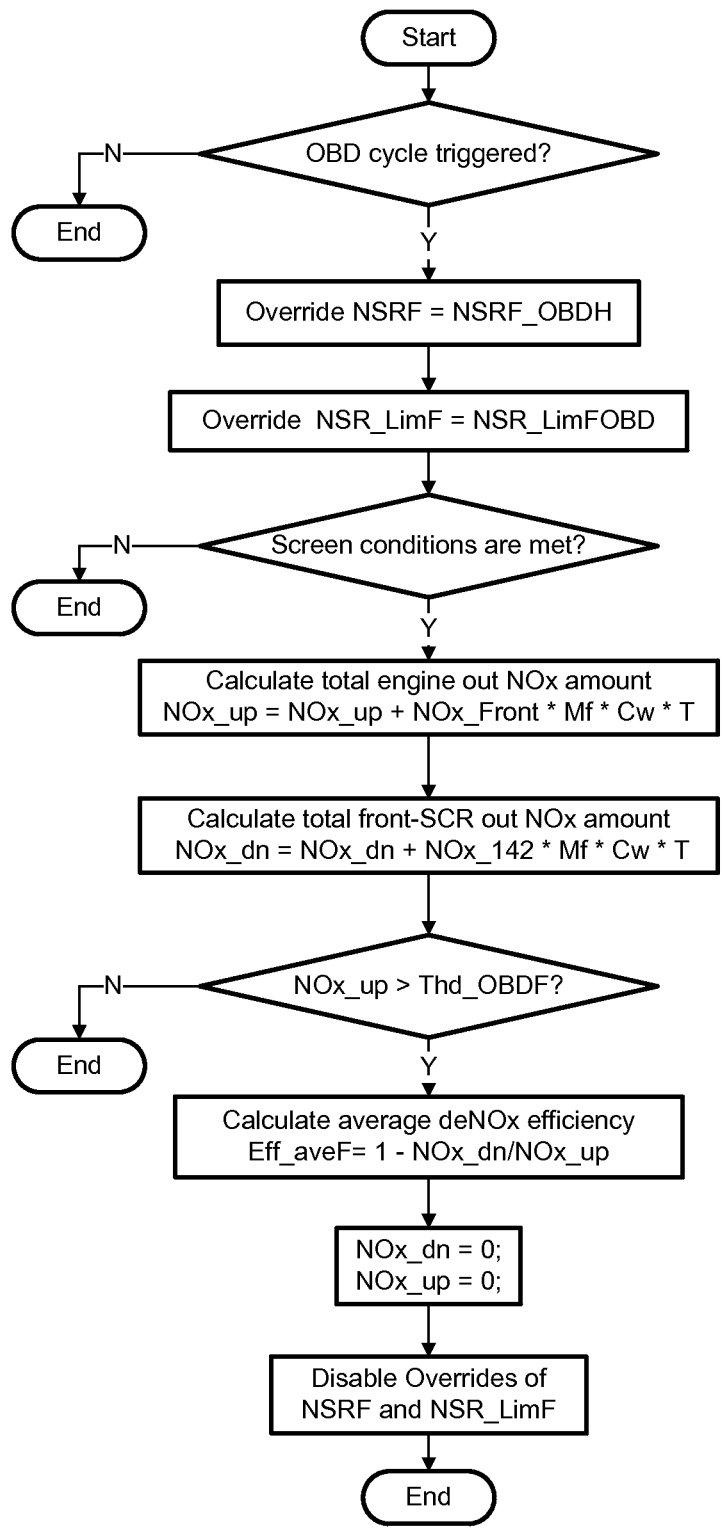
FIG. 6a a flow chart of a service routine for a timer based interrupt used in calculating an average deNOx efficiency for a front SCR device.

In diagnosing catalyst aging, a temporary over-dosing in the front SCR device can be used to detect more significant deNOx efficiency decrease at high NSRs, thereby more uncertainties in dosing rate control and deNOx efficiency measurements can be tolerated. When the front SCR is significantly aged, the over-dosing could cause more NOx be generated. This extra amount of NOx can be reduced by adjusting controls in the back SCR device. An exemplary algorithm for calculating deNOx efficiency at high NSRs can be realized with a service routine running periodically for a timer interrupt. Referring to FIG. 6a, in such a routine, an OBD cycle flag is first examined. The routine ends when an OBD cycle is not triggered, otherwise, the NSRF value is overrode to NSRF_OBDH, which is higher than the stoichiometric reaction ratio, and the NSR_LimF value is set to NSR_LimFOBD to move dosing limit out of way. Screen conditions for the diagnosis are then checked. The screen conditions include but not limited to that the values and changing rates of T141, T146, Mf, NOx_Front, and Sr1 are within certain limits and the status of these sensing values are valid. The routine ends when the screen conditions are not met, otherwise, the total engine out NOx amount NOx_up, and NOx amount at the outlet of the front-SCR, NOx_dn, are calculated. In the calculation, Cw is a constant and T is the execution period of the interrupt service routine. After the calculation of the NOx_up and NOx_dn values, the routine ends if the NOx_up value is not higher than a threshold Thd_OBDF, otherwise, an average deNOx efficiency of the front SCR, Eff_aveF, is calculated, and the NOx_up and NOx_dn values are reset to 0. The routine ends after the overrides of the NSRF and the NSR_LimF values are disabled.

Figure 5B:
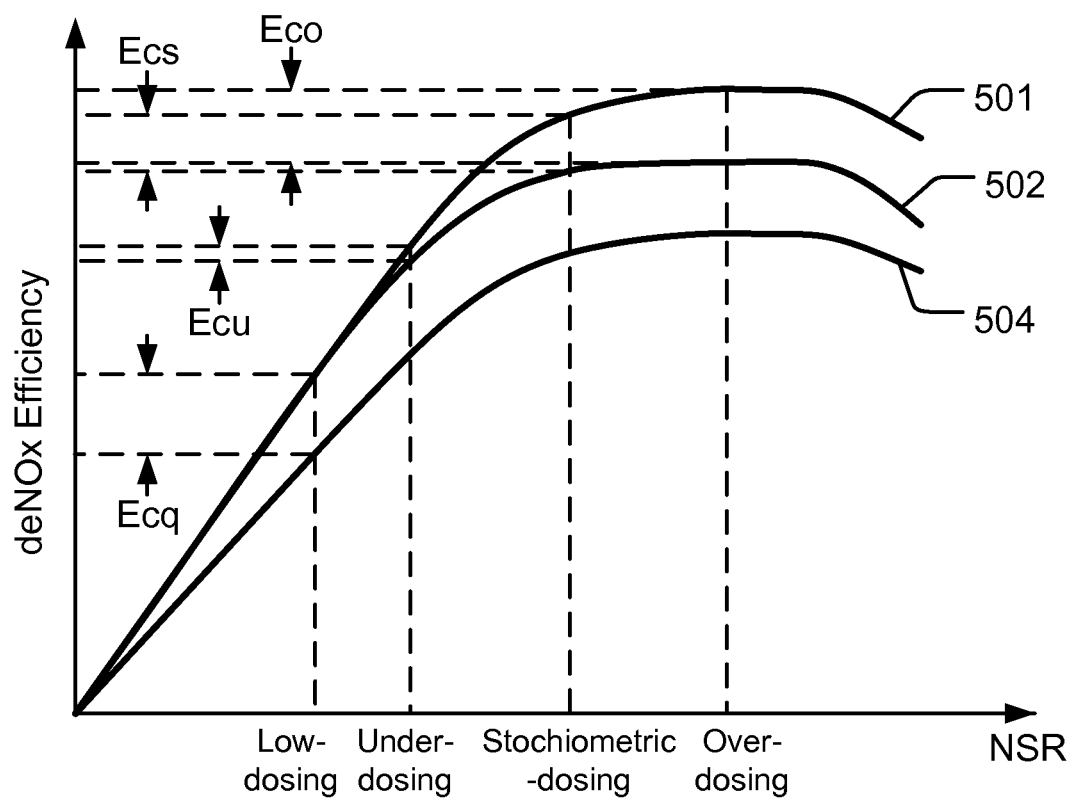
FIG. 5b shows relation curves between NSR values and deNOx efficiencies of normal and aged SCR devices, and a SCR device with a dosing or reductant quality issue.

Referring back to FIG. 5a, except to a seriously aged SCR, e.g. the one with the curve 503, at under-dosing NSRs, effects of aging cause little deNOx efficiency change. For example, a deNOx efficiency change of Ecu between the curves 501 and 502 at an under-dosing NSR is much lower than an Ecs value at the stoichiometric reaction ratio and an Eco value at an over-dosing NSR. However, issues with reductant dosing or reductant quality cause large deNOx efficiency change even at under-dosing NSRs. Referring to FIG. 5b, when reductant is diluted or the injector (e.g. the injector 140 in FIG. 1) is partially blocked, the deNOx efficiency of a SCR follows a curve 504. In FIG. 5b, even at low NSRs, e.g., a low-dosing NSR lower than the under-dosing NSR, a deNOx efficiency change Ecq could be higher than the Ecs or Eco values. Actually effects of dosing issues or reductant quality issues equivalently changes NSR values. If we assume a linear relationship between deNOx efficiency and NSR at NSRs lower than the stoichiometric reaction ratio, i.e., $$\text{Eff}=K*\text{NSR} \quad (2)$$

wherein Eff is a deNOx efficiency of a SCR device, and K is a constant, then when dosing issues or reductant quality causes lower NSRs, for example, diluting a reductant solution 20% equivalently decreases NSR by 20%, the deNOx efficiency changes to:

$$\text{Eff}=K*Rd*\text{NSR} \quad (3)$$

wherein Rd is an equivalent NSR changing factor. According to equation (3), the ratio of the deNOx efficiency Eff to the NSR value is an indication of dosing or reductant quality issues.

Figure 6B:
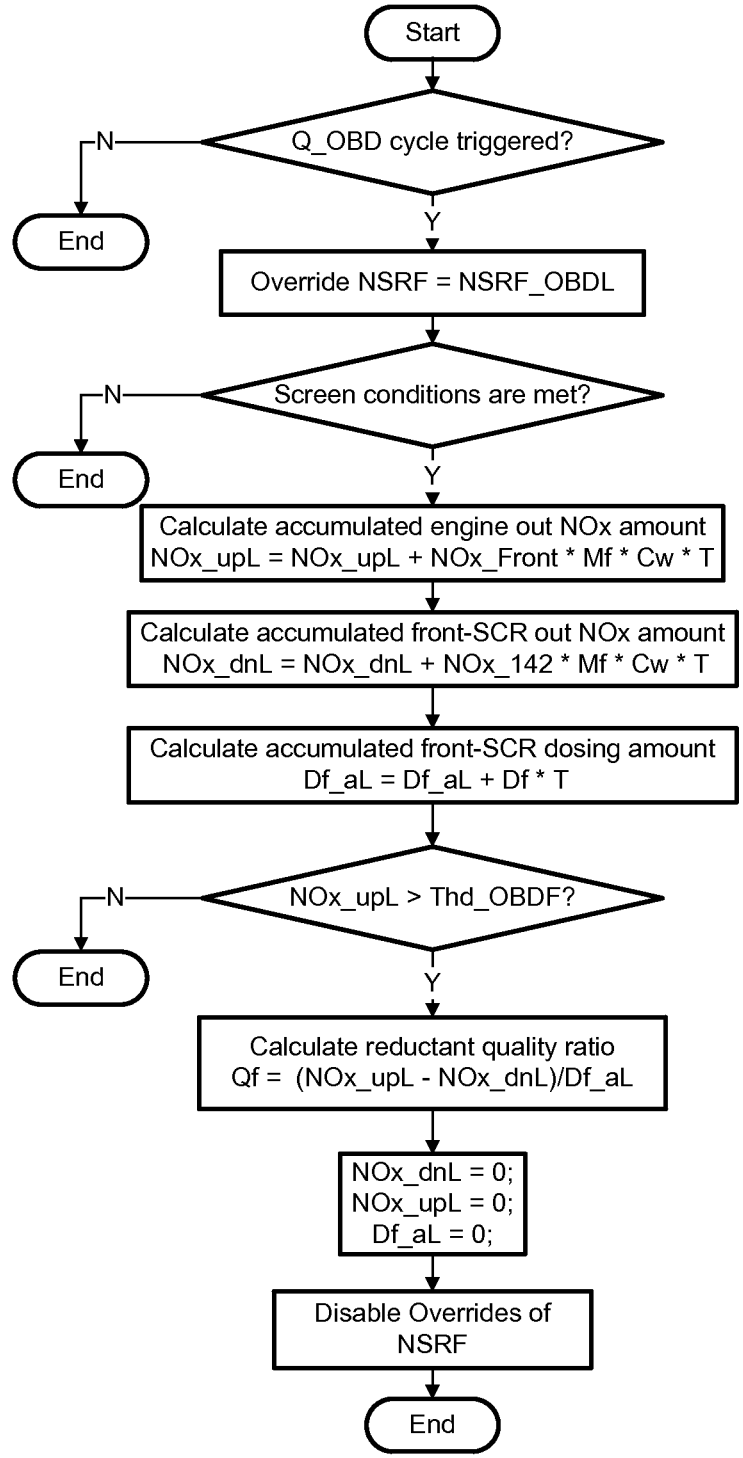
FIG. 6b is a flow chart of a service routine for a timer based interrupt used in calculating a reductant quality ratio for a front SCR device.

The ratio between deNOx efficiency and NSR at low dosing NSRs can be further used for diagnosing issues in dosing and reductant quality. This ratio is called reductant quality ratio, and an exemplary algorithm for calculating the ratio value for the front SCR device can be realized with a service routine running periodically for a timer interrupt, as shown in FIG. 6b. In this routine, an OBD cycle status is first checked. If a Q_OBD cycle is not triggered, then the routine ends, otherwise, the NSRF is overrode with an NSR-F_OBDL value. Screen conditions are then examined. The screen conditions include but not limited to that the values and changing rates of T141, T146, Mf, NOx_Front, and Sr1 are within certain limits and the status of these sensing values are valid. The routine ends when the screen conditions are not met, otherwise, an accumulated engine out NOx amount, NOx_upL, an accumulated NOx amount at the outlet of the front SCR, NOx_dnL, and an accumulated front-SCR dosing amount, Df_aL, are calculated. If the NOx_upL value is higher than a threshold Thd_OBDF, then a reductant quality ratio Qf, which is the ratio of the difference between the NOx_upL value and the NOx_dnL value to the Df_aL value, is calculated. The Qf value is also proportional to the ratio of an average deNOx efficiency to an average NSR, i.e., $$Qf=Cr*\text{Eff}\_aveFL/\text{NSR}\_FL$$

where Cr is a constant; Eff_aveFL is the average deNOx efficiency and $$\text{Eff}\_aveFL=(NOx\_upL-NOx\_dnL)/(NOx\_upL)$$

NSR_FL is proportional to the average NSR and $$NSR\_FL=Cr*Df\_aL/(NOx\_upL)$$

The values of NOx_dnL, NOx_upL, and Df_aL are reset to 0 thereafter, and the routine ends after the override of the NSRF value is disabled.

In the diagnostic algorithms of FIG. 6a and FIG. 6b, over-dosing and under-dosing NSRs for the front SCR device need to be temporally created. To keep the overall emission of the multi-stage SCR system within required level, the dosing NSRs for the back SCR device need to be adjusted accordingly. For example, when an over-dosing NSR is created for the front SCR device, the dosing rate of the back SCR needs to be decreased, and therefore, a lower NSRFB value needs to be set. When an under-dosing NSR is set for the front SCR device, a higher NSRFB value is needed. Similar algorithms can be used for detecting issues in the back SCR device. In these algorithms, when over-dosing and under-dosing NSRs are created for the back SCR device, the NSRF values need to be adjusted for compensating the dosing change.

Referring back to FIG. 5b, the curve 504 shows a deNOx efficiency curve when reductant is diluted or a dosing apparatus is under-dosing. Similar to the curve 504, when a dosing apparatus is over-dosing, or reductant is condensed, at NSRs lower than the stoichiometric reaction ratio, high deNOx efficiency is obtained. In the algorithm of FIG. 6b, this high deNOx efficiency results in a high Qf value.

When a catalyst is severely damaged, referring to FIG. 5a and FIG. 5b, even at NSRs lower than the stoichiometric reaction ratio, a low reductant quality ratio could be obtained. And if a dosing apparatus is seriously under dosing or reductant is diluted too much, then at NSRs higher than the stoichiometric reaction ratio, low deNOx efficiency could be detected. These features could be used for detecting serious issues in catalyst, dosing apparatus, or reductant.

Figure 7:
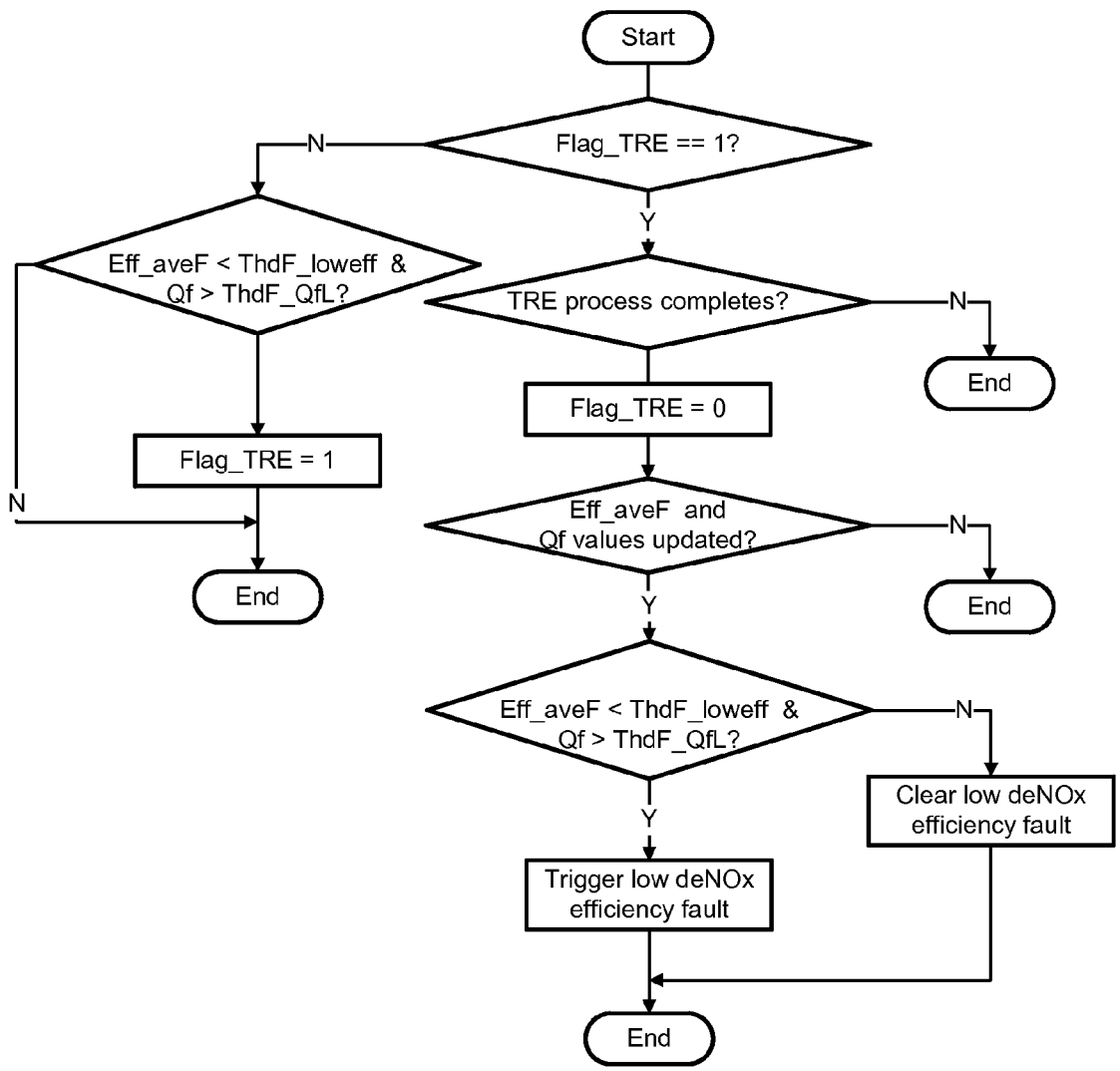
FIG. 7 is a flow chart of a service routine for a timer based interrupt used in isolating permanent catalyst issues from temporary poison problems.

In addition to detecting catalyst problems and dosing issues, the average deNOx efficiency calculated with the algorithm of FIG. 6a can be further used for isolating permanent damages from temporary poison to catalyst. Failure modes of a SCR catalyst includes HC poison, sulfur poison, thermal damage, precious metal contamination, and package metal contamination. In these failure modes, catalyst poison can be recovered under high temperature. However, thermal damage and metal contamination are not recoverable. After low deNOx efficiency is detected, a thermal recovery event, in which high temperature exhaust gas is generated in the engine through post fuel injections and/or in a DOC/DPF system upstream from the SCR system with HC dosing, can be used for detecting the permanent damages, and an exemplary algorithm can be realized with a service routine running periodically for a timer interrupt, as shown in FIG. 7. In this routine, the value of a thermal-recovery event flag Flag_TRE is checked first. If it equals one, then the routine ends if the thermal-recovery event is in process. When the thermal-recovery process completes, the Flag_TRE is reset to 0, and the Eff_aveF and Qf values are examined. The routine ends if these two values are not updated, otherwise, if the Eff_aveF value is lower than a threshold ThdF_loweff, and the Qf value is higher than a threshold ThdF_QfL, then a low deNOx efficiency fault is triggered, otherwise the low deNOx efficiency fault is cleared. The routine ends thereafter. Referring back to the examination of the Flag_TRE value, if it doesn't equal to 1, then the Eff_aveF and Qf values are checked. If the Eff_aveF value is lower than a threshold ThdF_loweff and the Qf value is higher than a threshold ThdF_QfL, then the Flag-_TRE value is set to 1. The routine ends thereafter. Diagnostic methods for issues in catalyst, dosing apparatus, and reductant with the average deNOx efficiency calculated with the algorithm of FIG. 6a and the reductant quality ratio calculated with the algorithm of FIG. 6b are summarized in FIG. 8.

Figure 9:
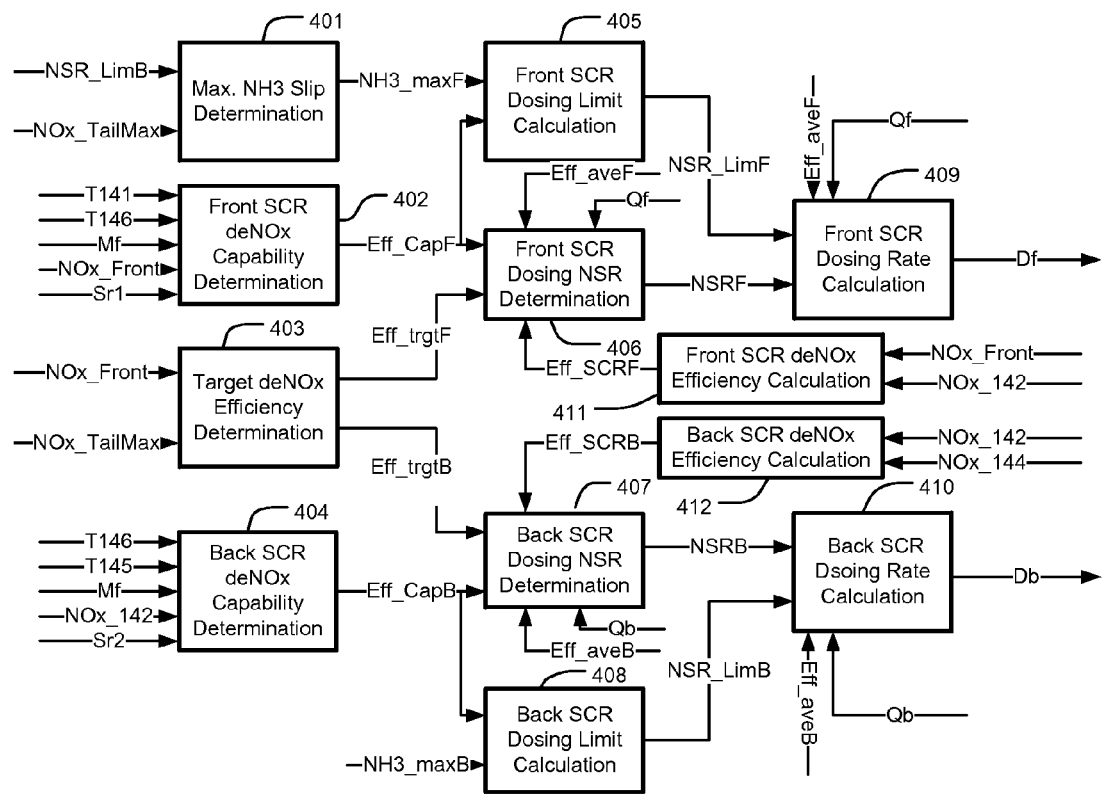
FIG. 9 is a block diagram for a feedback realization of a front SCR dosing rate calculation block and a back SCR dosing rate calculation block in a SCR control with compensations calculated using average deNOx efficiency and reductant quality ratios.

Referring back to FIG. 5a, when catalyst ages, normally deNOx efficiency cannot be increased by increasing dosing, and at higher NSRs, increasing dosing even decreases deNOx efficiency. However, as depicted in FIG. 5b, if reductant solution is diluted or a dosing apparatus is under dosing, for example, the injector nozzle of the dosing apparatus is partially blocked, increasing dosing increases deNOx efficiency. This fact makes it difficult to compensate dosing rate in a feedback control, since the two factors affecting deNOx efficiency require different compensating directions. The catalyst aging and dosing issues detected with algorithms of FIG. 6a and FIG. 6b separates the two factors and thereby can be further used for solving this problem in feedback control. As shown in FIG. 9, in such a feedback control, the Eff_aveF and Qf values are used in the block 406 in determining the NSRF value, while an Eff_aveB value and a Qb value calculated for the back SCR with algorithms similar to that of FIG. 6a and FIG. 6b are used in the block 407 in calculating the NSRB value. A variety of algorithms can be used in the feedback control. For example, in the block 406, the feedback calculation can be only enabled when the Eff_aveF values are higher than a normal threshold, and the Qf values are within a low-value range. In this way, the feedback control mainly compensates deNOx efficiency changes induced by dosing inaccuracy and reductant quality change.

The algorithms of FIG. 6a and FIG. 6b can also be used in single-stage SCR systems. Just due to lack of a means for adjusting the overall dosing control, the insertions, especially the under-dosing insertions may temporally create emission issues. In both of single-stage SCR systems and multi-stage SCR systems, when a SCR system is working at NSRs higher than the stoichiometric reaction ratio, as shown in FIG. 5a, lowering NSR would increase deNOx efficiency. In this case, a negative gain may be used in the feedback control. For example, in the controls of FIG. 4b, negative gains can be used in the feedback control in the block 406 when the Eff_aveF values are higher than a high threshold, and the Qf values are within a normal range.

In addition to adjusting feedback dosing controls, the reductant quality ratio calculated with the algorithm of FIG. 6b can also be used for directly compensating dosing rate commands when the average deNOx efficiency value calculated using the algorithm of FIG. 6a is higher than a threshold. As shown in FIG. 9, compensation can be added in the blocks 409 and 410 with the Eff_aveF, Qf, Eff_aveB, and Qb values. And the following equations can be used in a simple compensation algorithm:

$$Df=Df0*f(Qf)$$

$$Db=Db0*f(Qb)$$

wherein Db0 and Df0 are, respectively, the dosing commands for the front and back SCR devices without compensation, and f( ) is a function that can be realized with a lookup table.

Although the apparatus and method of the invention are described herein in relation to the preferred embodiments shown in FIGS. 1-9, certain design alternations and modifications will become apparent to those of ordinary skill in the art upon reading this disclosure in connection with the accompanying drawings. It is intended, however, that the scope of the invention be limited only by the appended claims.

The invention claimed is:

1. An exhaust gas after-treatment control system of an internal combustion engine comprising:
a first selective catalytic reduction device receiving an exhaust gas flow produced by said internal combustion engine;
a first dosing apparatus for delivering a reductant into said first selective catalytic reduction device;
a second selective catalytic reduction device positioned downstream from said first selective catalytic reduction device;
a second dosing apparatus for delivering said reductant into said second selective catalytic reduction device; and
a dosing controller configured to adjust a reductant delivery rate of said first dosing apparatus to control a first normalized stoichiometric ratio, which is equal to a ratio of a molar amount of ammonia generated from said reductant delivered by said first dosing apparatus to a molar amount of NOx in said exhaust gas flow, upstream from said first selective catalytic reduction device, higher than a first stoichiometric reaction ratio, which is a molar ratio of ammonia to NOx in a reaction in said first selective catalytic reduction device, in a diagnostic cycle in which anomalies in said first dosing apparatus are detected, and control said first normalized stoichiometric ratio lower than said first stoichiometric reaction ratio in normal operations other than said diagnostic cycle.

2. The exhaust gas after-treatment control system of claim 1, wherein said first dosing apparatus further includes:
a reductant tank;
a compressed air source;
a liquid supply tank having a first inlet port fluidly coupled to said reductant tank through a check valve, a second inlet port fluidly coupled to said compressed air source, a first outlet port for releasing compressed air from said liquid supply tank, and a second outlet port for reductant inside said liquid supply tank to flow out;
a pressure tank comprising a liquid outlet port and a liquid inlet port, which is fluidly coupled to said second outlet port of said liquid supply tank through a check valve;
and a first injector with a reductant inlet fluidly coupled to said liquid outlet port of said pressure tank allowing a first reductant flow to said first selective catalytic reduction device when it is energized and shutting off said first reductant flow after it is de-energized.

3. The exhaust gas after-treatment control system of claim 2, wherein said second dosing apparatus shares said reductant tank, said compressed air source, said liquid supply tank and said pressure tank with said first dosing apparatus and further includes a second injector with a reductant inlet fluidly coupled to said liquid outlet port of said pressure tank allowing a second reductant flow to said second selective catalytic reduction device when it is energized and shutting off said second reductant flow after it is de-energized.

4. The exhaust gas after-treatment control system of claim 1, wherein said dosing controller is further configured to adjust a delivery rate of said second dosing apparatus to control a second normalized stoichiometric ratio, which is equal to a ratio of a molar amount of ammonia generated from said reductant delivered by said second dosing apparatus to a molar amount of NOx in said exhaust gas flow, in between said first selective catalytic reduction device and said second selective catalytic reduction device, lower than a second stoichiometric reaction ratio, which is a molar ratio of ammonia to NOx in a reaction in said second selective catalytic reduction device.

5. The engine exhaust gas after-treatment control system of claim 4, wherein said dosing controller is further configured to control said second normalized stoichiometric ratio higher than said second stoichiometric reaction ratio in a diagnostic cycle in which anomalies in said second dosing apparatus are detected.

6. An exhaust gas after-treatment diagnostic system for an internal combustion engine, comprising:
a first selective catalytic reduction device receiving an exhaust gas flow produced by said internal combustion engine;

a first NOx concentration detection means positioned upstream from said first selective catalytic reduction device generating a first NOx concentration signal;

a second NOx concentration detection means positioned downstream from said first selective catalytic reduction device generating a second NOx concentration signal;

a first dosing apparatus for delivering a reductant into said first selective catalytic reduction device, a dosing controller adapted to adjust a first reductant delivery rate of said first dosing apparatus according to a first reductant dosing command to control a first normalized stoichiometric ratio, which is equal to a ratio of a molar amount of ammonia generated from said reductant delivered by said first dosing apparatus to a molar amount of NOx in said exhaust gas flow, upstream from said first selective catalytic reduction device; and a diagnostic controller configured to generate a first diagnostic cycle in which said dosing controller is configured to control said first normalized stoichiometric ratio lower than a first stoichiometric reaction ratio, which is a molar ratio of ammonia to NOx in a reaction in said first selective catalytic reduction device, and calculate a first reductant quality ratio, which is indicative of a ratio of a NOx concentration change in said exhaust gas flow across said first selective catalytic reduction device to a concentration of said reductant delivered by said first dosing apparatus in said exhaust gas flow upstream from said first selective catalytic reduction device, in response to said first NOx concentration signal, said second NOx concentration signal, and said first reductant dosing command.

7. The exhaust gas after-treatment diagnostic system of claim 6, wherein said diagnostic controller is further configured to generate a second diagnostic cycle in which said dosing controller is configured to control said first normalized stoichiometric ratio higher than said first stoichiometric reaction ratio, and calculate a first deNOx efficiency, which is indicative of a ratio of a NOx concentration change in said exhaust gas flow across said first selective catalytic reduction device to a NOx centration in said exhaust gas flow upstream from said first selective catalytic reduction device, in response to said first NOx concentration and said second NOx concentration signals.

8. The exhaust gas after-treatment diagnostic system of claim 7, wherein said dosing controller is further configured to calculate said first reductant dosing command in response to said first deNOx efficiency and said first reductant quality ratio.

9. The exhaust gas after-treatment diagnostic system of claim 7, wherein said diagnostic controller is further configured to generate a first fault flag indicative of a catalyst issue in said first selective catalytic reduction device when said first deNOx efficiency is lower than a predetermined value, and generate a second fault flag indicative of a reductant delivery and quality issue when said first reductant quality ratio is out of a predetermined range.

10. The exhaust gas after-treatment diagnostic system of claim 7, wherein said diagnostic controller is further configured to trigger a thermal recovery event, in which high temperature exhaust gas is generated for recovering said first selective catalytic reduction device, when said first deNOx efficiency is lower than a first predetermined value, and said first reductant quality ratio is within a predetermined range, and configured to generate a third fault flag indicative of a permanent catalyst issue when said first deNOx efficiency is lower than a second predetermined value after said thermal recovery event completes.

11. The exhaust gas after-treatment diagnostic system of claim 7, further comprising:

a second selective catalytic reduction device positioned downstream from said second NOx concentration detection means;

a third NOx concentration detection means positioned downstream from said second selective catalytic reduction device generating a third NOx concentration signal; and a second dosing apparatus for delivering said reductant into said second selective catalytic reduction device.

12. The exhaust gas after-treatment diagnostic system of claim 11, wherein said dosing controller is further configured to adjust a second delivery rate of said second dosing apparatus according to a second reductant dosing command to control a second normalized stoichiometric ratio, which is equal to a ratio of a molar amount of ammonia generated from said reducant delivered by said second dosing apparatus to a molar amount of NOx in said exhaust gas flow, in between said first selective catalytic reduction device and said second selective catalytic reduction device.

13. The exhaust gas after-treatment diagnostic system of claim 12, wherein said diagnostic controller is further configured to generate a third diagnostic cycle in which said dosing controller is configured to control said second normalized stoichiometric ratio lower than a second stoichiometric reaction ratio, which is a molar ratio of ammonia to NOx in a reaction in said second selective catalytic reduction device, and calculate a second reductant quality ratio, which is indicative of a ratio of a NOx concentration change in said exhaust gas flow across said second selective catalytic reduction device to a concentration of said reductant delivered by said second dosing apparatus in said exhaust gas flow in between said first selective catalytic reduction device and said second selective catalytic reduction device, in response to said second NOx concentration signal, said third NOx concentration signal, and said second reductant dosing command, and configured to generate a fourth diagnostic cycle in which said dosing controller is configured to control said second normalized stoichiometric ratio higher than said second stoichiometric reaction ratio and calculate a second deNOx efficiency, which is indicative of a ratio of a NOx concentration change in said exhaust gas flow across said second selective catalytic reduction device to a NOx centration in said exhaust gas flow in between said first selective reduction device and said second selective catalytic reduction device, in response to said second NOx concentration and said third NOx concentration signals.

14. The exhaust gas after-treatment diagnostic system of claim 13, wherein said dosing controller is further configured to calculate said second reductant dosing command in response to said second deNOx efficiency and said second reductant quality ratio.

15. The exhaust gas after-treatment diagnostic system of claim 13, wherein said diagnostic controller is further configured to generate a fourth fault flag indicative of a catalyst issue in said second selective catalytic reduction device when said second deNOx efficiency is lower than a predetermined value, and generate a fifth fault flag indicative of a reductant delivery and quality issue when said second reductant quality ratio is out of a predetermined range.

16. An exhaust gas after-treatment control system for an internal combustion engine, comprising:

a first selective catalytic reduction device receiving an exhaust gas flow produced by said internal combustion engine;

a first NOx concentration detection means positioned upstream from said first selective catalytic reduction device generating a first NOx concentration signal;

a second NOx concentration detection means positioned downstream from said first selective catalytic reduction device generating a second NOx concentration signal;

a first dosing apparatus for delivering a reductant into said first selective catalytic reduction device, a dosing controller adapted to adjust a first reductant delivery rate of said first dosing apparatus according to a first reductant dosing command to control a first normalized stoichiometric ratio, which is equal to a ratio of a molar amount of ammonia generated from said reductant delivered by said first dosing apparatus to a molar amount of NOx in said exhaust gas flow, upstream from said first selective catalytic reduction device; and a feedback controller configured to generate a first detection cycle in which said dosing controller is configured to control said first normalized stoichiometric ratio lower than a first stoichiometric reaction ratio, which is a molar ratio of ammonia to NOx in a reaction in a first selective catalytic reduction device, and calculate a first reductant quality ratio, which is indicative of a ratio of a NOx concentration change in said exhaust gas flow across said first selective catalytic reduction device to a concentration of said reductant delivered by said first dosing apparatus in said exhaust gas flow upstream from said first selective catalytic reduction device, in response to said first NOx concentration signal, said second NOx concentration signal, and said first reductant dosing command, wherein said feedback controller is further configured to calculate said first reductant dosing command in response to said first reductant quality ratio.

17. The exhaust gas after-treatment control system of claim 16, wherein said feedback controller is further configured to generate a second detection cycle, in which said dosing controller is configured to control said first normalized stoichiometric ratio higher than said first stoichiometric reaction ratio, and calculate a first deNOx efficiency, which is indicative of a ratio of a NOx concentration change in said exhaust gas flow across said first selective catalytic reduction device to a NOx centration in said exhaust gas flow upstream from said first selective catalytic reduction device, according to said first NOx concentration and said second NOx concentration signals, and configured to calculate said first reductant dosing command in response to said first deNOx efficiency.

18. The exhaust gas after-treatment control system of claim 16, further comprising:
a second selective catalytic reduction device positioned downstream from second NOx concentration detection means;
a third NOx concentration detection means positioned downstream from said second selective catalytic reduction device generating a third NOx concentration signal; and
a second dosing apparatus for delivering said reductant into said second selective catalytic reduction device.

19. The exhaust gas after-treatment control system of claim 18, wherein said dosing controller is further configured to adjust a delivery rate of said second dosing apparatus according to a second reductant dosing command to control a second normalized stoichiometric ratio, which is equal to a ratio of a molar amount of ammonia generated from said reductant delivered by said second dosing apparatus to a molar amount of NOx in said exhaust gas flow, in between said first selective catalytic reduction device and said second selective catalytic reduction device, and said feedback controller is further configured to generate a third detection cycle in which said dosing controller is configured to control said second normalized stoichiometric ratio lower than a second stoichiometric reaction ratio, which is a molar ratio of ammonia to NOx in a reaction in said second selective catalytic reduction device, and calculate a second reductant quality ratio, which is indicative of a ratio of a NOx concentration change in said exhaust gas flow across said second selective catalytic reduction device to a concentration of said reductant delivered by said second dosing apparatus, in response to said second NOx concentration signal, said third NOx concentration signal, and said second reductant dosing command, and configured to calculate said second reductant dosing command in response to said second reductant quality ratio.

20. The exhaust gas after-treatment control system of claim 19, wherein said feedback controller is further configured to generate a fourth detection cycle in which said dosing controller is configured to control said second normalized stoichiometric ratio higher than said second stoichiometric reaction ratio and calculate a second deNOx efficiency, which is indicative of a ratio of a NOx concentration change in said exhaust gas flow across said second selective catalytic reduction device to a NOx centration in said exhaust gas flow in between said first selective catalytic reduction device and said second selective catalytic reduction device, in response to said second NOx concentration and said third NOx concentration signals, and configured to calculate said second reductant dosing command in response to said second deNOx efficiency.

* * * * *